United States Patent [19]

McCoskey

[11] Patent Number: 4,458,327

[45] Date of Patent: Jul. 3, 1984

[54] PRIME OR RELATIVELY PRIME RADIX DATA PROCESSING SYSTEM

[75] Inventor: J. Marion McCoskey, Round Mountain, Calif.

[73] Assignee: John Larson, Sonoma, Calif. ; a part interest

[21] Appl. No.: 219,321

[22] Filed: Dec. 22, 1980

Related U.S. Application Data

[63] Continuation-in-part of Ser. No. 53,083, Jun. 28, 1979, abandoned.

[51] Int. Cl.$^3$ .............................................. G06F 7/72
[52] U.S. Cl. .................................................. 364/746
[58] Field of Search ......................................... 364/746

[56] References Cited

U.S. PATENT DOCUMENTS

| | | | |
|---|---|---|---|
| 3,167,645 | 1/1965 | Hoffman et al. | 364/746 |
| 4,041,284 | 8/1977 | Bond | 364/746 X |
| 4,107,783 | 8/1978 | Huang | 364/746 |
| 4,121,298 | 10/1978 | Akushsky et al. | 364/746 |
| 4,281,391 | 7/1981 | Huang | 364/746 |

OTHER PUBLICATIONS

"Modular Arithmetic . . . An Ancient Science for a New Computer," *Westinghouse Engineer*, Jul. 1963, pp. 112-114.
Banerji et al., "On Translation Algorithms in Residue Number Systems," *IEEE Trans. on Computers*, vol. C-21, No. 12, Dec. 1972, pp. 1281-1285.
Levine et al., "New Techniques in Residue Arithmetic," 1960 *Conference Proceeding* 4th *National Convention on Military Electronics*, pp. 183-189.

*Primary Examiner*—David H. Malzahn
*Attorney, Agent, or Firm*—Willis E. Higgins; Julian Caplan

[57] ABSTRACT

This system is configured to operate in a number system in which the radix of each digit is a different prime number, or a system in which all of the radices are relatively prime, hereafter a prime or relatively prime radix number system. The system includes an input/output device which inputs data in a constant radix number system and outputs results of operations carried out in the system in a constant radix number system. A means is connected to the I/O device for converting the input data from the constant radix number system to the prime or relatively prime radix number system. A processing means is connected to the converting means for carrying out operations on the input data in prime or relatively prime radix form. A memory means connected to the processing means stores the data and results of operations thereon in prime or relatively prime radix form. Since there is no carry required to perform arithmetic operations except divide in the prime or relatively prime radix number system, such operations are substantially simplified in comparison with corresponding operations with a constant radix number system.

34 Claims, 6 Drawing Figures

PRIME OR RELATIVELY PRIME RADIX DATA PROCESSING SYSTEM

CROSS-REFERENCE TO RELATED APPLICATION

This application is a continuation-in-part of my earlier application Ser. No. 053,083, now abandoned, filed June 28, 1979, and entitled "Prime Radix Data Processing System."

BACKGROUND OF THE INVENTION

1. Field of the Invention

This invention relates to a new type of data processing system. More particularly, it relates to a data processing system in which operations are carried out through use of a number system allowing data processing operations to be carried out more efficiently than with a conventional constant radix number system. Most especially, it relates to such a data processing system in which operations involving large numbers may be carried out in a substantially simpler manner than with conventional data processing systems.

2. Description of the Prior Art

There are a variety of data processing systems and sub-systems known in the prior art which perform arithmetical operations using the so-called system of residual classes or residue class arithmetic. In such systems, prime or relatively prime or mutually prime radices are employed. Relatively prime or mutually prime radices have no common divisor, even though the individual radices may be divisible by other than one and the radix itself. Examples of such systems and sub-systems are disclosed in U.S. Pat. No. 3,167,645; U.S. Pat. No. 3,602,704; U.S. Pat. No. 3,980,874; U.S. Pat. No. 4,041,084; and U.S. Pat. No. 4,064,400. However, such prior art systems employ the Chinese Remainder Theorem, which requires the storage and use of a large number of constants, to convert the modular numbers used to perform calculations in the system back into decimal or binary form for output. For example, "Modular Arithmetic . . . an Ancient Science for a New Computer", *Westinghouse Engineer*, July 1963, pp. 112-114, points out that such a reconversion for a system using the prime numbers 2 through 31 would require storage of 150 predetermined constants of about 40 bits each, or a total of 6,000 bits.

There are also scientifically oriented data processing systems which are capable of carrying out certain types of calculations substantially faster than typical general purpose data processing systems. For example, one such system operates at 80,000 operations per second and multiplies one decimal digit at a time. With a 64-bit data bus it can handle 8 decimal digits to a 16 digit product without using a multiple precision routine. This involves 64 machine cycles for the multiplications and 64 machine cycles for the additions, or a minimum of 128 machine cycles per 8 digit number.

SUMMARY OF THE INVENTION

Accordingly, it is an object of this invention to provide a data processing system which carries out data processing operations in a simplified manner utilizing a prime or relatively prime radix number system.

It is another object of this invention to provide a data processing system organized to operate efficiently in accordance with computation rules applicable to the prime or relatively prime radix number system.

It is a further object of the invention to provide a data processing system that substantially reduces the number of machine cycles required to perform arithmetic operations, especially on large numbers.

It is still another object of the invention to provide a data processing system that can process large numbers through the use of parallel processors without provision for a carry operation.

It is yet another object of the invention to provide a computer with easily variable radices, register length and number of registers.

The attainment of the foregoing and related objects may be achieved through use of the novel data processing system herein disclosed. This data processing system has an I/O device for inputting data in a constant radix number system and for outputting results of operations carried out in the system in a constant radix number system by solving a linear congruence of the prime or relatively prime radices. Means is connected to the I/O device for converting the input data from a constant radix number system to the prime or relatively prime radix number system, i.e., a number system in which the radix of each digit is a different prime number or in which the radices of the digits are relatively or mutually prime. This number system can alternatively be referred to as one in which the radices of each digit are at least mutually prime. A processing means is connected to the converting means for carrying out operations on the input data in prime or relatively prime radix form. A memory means is connected to the processing means for storing the data and results of operations thereon in prime or relatively prime radix form.

Preferably, the processing means includes a plurality of processors each capable of executing operations in a prime or relatively prime radix form in parallel under control of a master processor. The memory means is preferably arranged in arrays of unequal size, with smaller arrays for the first significant digits of prime or relatively prime radix numbers, and the arrays increasing in size for further significant digits of prime or relatively prime radix numbers in relation to the relative value of the successive prime or relatively prime radices. In an especially preferred system, the memory arrays are each connected between one of the parallel processors and the master processor.

By use of such a parallel processing technique with no carry required due to the nature of prime or relatively prime radix arithmetic, significantly more efficient data processing may be obtained, especially with large numbers. In conventional constant radix number systems, the complexity of calculations increases geometrically with the size of the number. In contrast, in a prime or relatively prime radix number system, the complexity of calculations with increasing number size increases only at a rate which is almost linear. This result is obtained because prime or relatively prime radix addition, subtraction and multiplication are non-interactive operations, i.e., no carry is required. In particular, multiplication is almost as simple as addition and subtraction in prime or relatively prime radix. It involves a simple, one step operation on the two numbers being multiplied. With an integrated circuit processor, on chip multiply is almost as simple to implement as on chip addition and subtraction.

A data processing system in accordance with this invention can be designed either to achieve maximum speed of operations, or where speed is not a primary consideration, to simplify the required circuits and programs, due to the simplified nature of operations in the prime radix number system. For example, a portable data processing system having a clock frequency of 1.83 millicycles can be provided, which can multiply 100 decimal digit numbers in about 50 machine cycles. This is an effective speed faster than that of a typical prior art high speed scientific data processing system because such a system would require a minimum of 25,000 machine cycles for the same task.

On the other hand, a more sophisticated machine operating at a comparable clock rate as a prior art high speed scientific processing system and utilizing the prime radix number system can add, subtract or multiply 1,000 decimal digit numbers in one clock pulse. Such a system can multiply such large numbers millions of times faster than such a prior art system.

Use of the technique of solving a linear congruence of prime or relatively prime radices to convert from the prime or relatively prime radix number system to a constant radix number system also is significantly simpler than use of the Chinese Remainder Theorem as in prior art modular arithmetic processors for this conversion. In contrast to the large number of constants taught as necessary in the above-referenced Westinghouse Engineer article, the linear congruence approach of this invention requires only M-1 constants, where M is the number of prime or relatively prime radix digits used. This amounts to only 10 constants having a total of 30 bits for the same example as in the Westinghouse Engineer article. For that example, this amounts to a reduction by a factor of 200 in the amount of storage required for the constants over the Chinese Remainder Theorem.

Another desirable feature that flows from the use of the prime radix number system in this invention is increased reliability through a variable redundancy scheme. The field required for carrying out calculations is determined by the largest number being operated on. Smaller numbers included in the calculation may take up only a fraction of the field determined by the largest number in the calculation. The fields used for the smaller numbers may therefore be partitioned in order to repeat the smaller numbers several times. The number of such repetitions may vary, depending on the size of the smaller numbers; hence, a variable redundancy.

The form of communication to and from the system operating in prime or relatively prime radix form may be varied. For example, the constant radix I/O device may be provided with a selectable radix, either a compound number constant radix or a prime number constant radix. The I/O device may also provide data in analog form, which is converted directly to prime or relatively prime radix form for operations by an analog/prime or relatively prime radix converter, with the answers being converted either back to analog form or to constant radix form after completion of the operations.

The attainment of the foregoing and related objects, advantages and features of the invention should be more readily apparent to those skilled in the art after review of the following more detailed description of the invention, taken together with the drawings, in which:

DETAILED DESCRIPTION OF THE INVENTION

Before describing the present system in detail, it will be useful to describe the prime or relatively prime radix number system and some of its characteristics. The prime radix number system uses only primes as its radices. Euler's system of residues accepted mutually prime radices because his system of analysis, the index calculus, saw no difference between a set of mutually prime numbers and a set of prime numbers. Heterodyne analysis, which is the system of analysis associated with the prime radix number system, will also work on all congruences with prime moduls and congruences with mutually or relatively prime moduls as well. For the following discussion and the remainder of the detailed description of the invention, the term "prime radix" will be used for convenience. It should be understood, however, that the following principles and description apply equally as well to a relatively prime radix number system and a data processing system employing relatively prime radix numbers in its operations.

It is usually convenient to use the first few primes as radices, taken them in their natural order, but this is not necessary. Any set of primes can form the radices of a prime radix number system. A reader who was a competent student of Euler's works would understand from the above remarks how to translate a number into the prime radix number system, and add, subtract, and multiply in the system, but we will try to set forth enough examples and explanations to bring the less advanced reader up to that point before going on to some of the more complex concepts.

Assuming that the reader is already aware that a prime is a number that is not evenly divisible by any other number except one, the next concept to master is that of modulus or residue. The Gaussian concept of modulus is probably less applicable to this work than Euler's residue, but both will be used interchangeably here. In any case, what we are concerned with here can be expressed in this simple verbal form:

First divide, then throw away the answer and keep the remainder. This is usually written in this form:

$$A \equiv N \text{ MOD } P$$

This is read as: A is congruent to N modulus P. What is meant is that there is some number X such that:

$$A - PX = N$$

Here, and throughout this application we are only concerned with solutions to any of the expressions where all the variables take only integral values.

We are usually concerned with finding the value of N that lies between zero and P. Let's do a numerical example.

$$25 \equiv ?\, \text{MOD}\, 7$$

The first step is to divide 25 by 7. This gives us: 3.57 on the calculator. The next step is to round this number down getting rid of the 0.57 and keeping the three. Then we multiply getting 3 times 7 equals 21. 25−21 equals 4. Therefore:

$$25 \equiv 4 \, \text{MOD}\, 7$$

The next step is to master the process of translating numbers from decimal to prime radix notation. Any prime radix number is really only a linear congruence of the form:

$$X \equiv N_o \, \text{MOD}\, P_o \equiv N_1 \, \text{mod}\, P_1 \equiv N_2 \, \text{mod}\, P_2 \equiv \ldots N_k \, \text{mod}\, P_k$$

It is preferred to express this in an arithmetic form, putting the residues on the top and the radices or moduls on the bottom:

$$\frac{N_o\, N_1\, N_2}{P_o\, P_1\, P_2} \cdots \frac{N_k}{P_k}$$

Congruences written in this form can be manipulated with certain simple rules. Hopefully, the reader who is not acquainted with these rules will become familiar with them as the description proceeds. If we were going to be dealing with a lot of congruences which had the first few primes as radices, we might get tired of writing the bottom line and express the same congruence simply by writing the top line of number with commas in between.

$$N_o,\, N_1,\, N_3,\, \ldots,\, N_k$$

So that if the reader should see a series of numbers arranged in this fashion in this description he should assume that they represent a prime radix number with the first few primes as radices.

Now we should be prepared to deal with the problem of translating numbers into the prime radix notation. As an example for the reader, we will take the number 125 from decimal to prime radix. Our first consideration is to determine the number of prime radix digits needed to express a number of this size. To do this we have to know that the composite radix of a congruence of prime radices is simply the product of all the radices. So the reader might find it convenient to memorize the first few terms of the series. 2 times 3 equals 6. 6 times 5 equals 30. 30 times 7 equals 210. 210 times 11 equals 2310. 2310 times 13 equals 30,030. What we have to do now is look for the number next larger than 125 in this series. This number is 210. That means we can express 125 in four prime radix digits.

1,2,0,6

The next logical step would seem to be to learn how to translate numbers from prime radix to a constant radix notation—usually decimal. To do this efficiently, we need to understand heterodyne charts.

The heterodyne chart is a simple concept. Probably the best way to explain it is to show a numerical example Let's do the heterodyne chart for the numbers 4 and 11. In my notation this problem would be expressed as:

$$4 \fbox{11}\quad \text{The heterodyne symbol.}$$

This is verbalized as, "A four by eleven chart".

The heterodyne chart is a somewhat rectangular array of the numbers themselves. The two numbers being heterodyned must always be mutually prime. That means they must have no common factors greater than one. The number on the left must be smaller than the number on the right. The number on the left determines the number of rows in the chart. The number on the right determines the number of numbers or elements in the chart.

The first number in any heterodyne chart is zero. The next number would be the number in the left part of the heterodyne symbol. That would be four in this case. To find the next number, we add four, getting eight. We keep doing this until we get a number that is bigger than the number in the right of the heterodyne symbol which is eleven in this example. 8 plus 4 is 12, which is more than 11. This means that 8 is the last number in the first row of the heterodyne chart. We are now prepared to write the first row of our chart.

0 4 8

The next row will start on 1. The one after that will start on 2, then 3. There will be four rows and 11 elements. The complete chart is shown below.

```
3  7
2  6  10
1  5   9
0  4   8
```

For more explanations, let's do the same thing with letter-variables, but just for the first row of the chart.

$$A \fbox{P}$$

$0,\, A,\, 2A,\, 3A,\, \ldots,\, XA \quad$ Where $(X + 1)A - P < A.$

Now we will go into the problem of finding some number N in the heterodyne chart. If we start at zero, counting the first number we come to as one, and the next as two, etc., how many numbers will we have to look at until we find the one we are looking for? The first method we are going to study is simply the one of counting numbers. This probably the most efficient method for the solution of small congruences by beginners.

$$\frac{N}{A \fbox{P}}$$

This is the notation used to express that problem. Now we would do a numerical example. Let's go through this problem together.

This is the chart for $\overline{4 | 11}^{9}$:

```
3 7
2 6 10
1 5 9
0 4 8
```

We would count the numbers in this order:

```
9 10
6 7 8
3 4 5
0 1 2
```

Or: $4 \times 5 = 20, 20 - 11 = 9$

Now we will learn to tell the number of rows in a chart without writing the whole chart. If we have:

$$\overline{A | P}$$

If $A > \tfrac{1}{2} P$, there are $P - A$ rows.
If $A < \tfrac{1}{2} P$, there are $A$ rows.

There are always P elements in any chart.
Now we should do an example. If we have:

$$\overline{999{,}979 | 999{,}983}$$

There are $999{,}983 - 999{,}979 = 4$ rows in the chart.

| 1. | 2. | 3. | 4. | 5. | 6. | 7. | 8. | 9. | 10. |
|---|---|---|---|---|---|---|---|---|---|
| 11. | 11. | 11. | 11. | 11. | 11. | 11. | 11. | 11. | 11. |
| 0. | 0. | 0. | 0. | 0. | 0. | 0. | 0. | 0. | 0. |
| 1. | 2. | 3. | 4. | 5. | 6. | 7. | 8. | 9. | 10. |
| 2. | 4. | 6. | 8. | 10. | 1. | 3. | 5. | 7. | 9. |
| 3. | 6. | 9. | 1. | 4. | 7. | 10. | 2. | 5. | 8. |
| 4. | 8. | 1. | 5. | 9. | 2. | 6. | 10. | 3. | 7. |
| 5. | 10. | 4. | 9. | 3. | 8. | 2. | 7. | 1. | 6. |
| 6. | 1. | 7. | 2. | 8. | 3. | 9. | 4. | 10. | 5. |
| 7. | 3. | 10. | 6. | 2. | 9. | 5. | 1. | 8. | 4. |
| 8. | 5. | 2. | 10. | 7. | 4. | 1. | 9. | 6. | 3. |
| 9. | 7. | 5. | 3. | 1. | 10. | 8. | 6. | 4. | 2. |
| 10. | 9. | 8. | 7. | 6. | 5. | 4. | 3. | 2. | 1. |

These charts are upside down and not separated into rows, but they do illustrate a certain symmetry principle that is important to heterodyne analysis.

| 1. | 2. | 3. | 4. | 5. | 6. | 7. | 8. | 9. | 10. | 11. |
|---|---|---|---|---|---|---|---|---|---|---|
| 12. | 12. | 12. | 12. | 12. | 12. | 12. | 12. | 12. | 12. | 12. |
| 0. | 0. | 0. | 0. | 0. | 0. | 0. | 0. | 0. | 0. | 0. |
| 1. | 2. | 3. | 4. | 5. | 6. | 7. | 8. | 9. | 10. | 11. |
| 2. | 4. | 6. | 8. | 10. | 0. | 2. | 4. | 6. | 9. | 10. |
| 3. | 6. | 9. | 0. | 3. | 6. | 9. | 0. | 3. | 6. | 9. |
| 4. | 8. | 0. | 4. | 8. | 0. | 4. | 8. | 0. | 4. | 8. |
| 5. | 10. | 3. | 8. | 1. | 6. | 11. | 4. | 9. | 2. | 7. |
| 6. | 0. | 6. | 0. | 6. | 0. | 6. | 0. | 6. | 0. | 6. |
| 7. | 2. | 9. | 4. | 11. | 6. | 1. | 8. | 3. | 10. | 5. |
| 8. | 4. | 0. | 8. | 4. | 0. | 8. | 4. | 0. | 8. | 4. |
| 9. | 6. | 3. | 0. | 9. | 6. | 3. | 0. | 9. | 6. | 3. |
| 10. | 8. | 6. | 4. | 2. | 0. | 10. | 8. | 6. | 4. | 2. |
| 11. | 10. | 9. | 8. | 7. | 6. | 5. | 4. | 3. | 2. | 1. |

This symmetry can be expressed verbally like this: The chart defined by A and P is a mirror image of the chart defined by P−A and P. Or to put it in heterodyne symbols:

$$\overline{A | P} \quad \overline{P - A | P}$$

Or,

If $\overline{\dfrac{N}{A | P}} = X$, $\overline{\dfrac{N}{P - A | P}} = P - X$

In other words, there are different rules for solving heterodyne problems according to whether the chart you are working with has A greater than one half P or A less than one half P. If A is greater than one half P, all the lines of the chart start with large numbers which get smallest at the end of the line. If A is less than $\tfrac{1}{2}P$, as the reader knows, the numbers in each row will get larger. Also, for every chart where A is greater than one half P there is a chart that is exactly its mirror image which is defined by the numbers P−A and P.

Keeping this principle in mind can make computations simpler.

We should now learn to compute the distance between any two points on a heterodyne chart. This is expressed by the following notation:

$$\overline{\dfrac{M - N}{A | P}} = Y$$

This is computed by:

$$\left( \overline{\dfrac{M}{A | P}} - \overline{\dfrac{N}{A | P}} + P \right) \bmod P$$

Or by simply counting the numbers between N and M in the chart starting with the number after N and ending on M. Let's do the following problem:

$$\overline{\dfrac{4 - 9}{4 | 11}}$$

Here's the chart:
```
3 7
2 6 10
1 5 9
0 4 8
```

Here's the count:
```
    4 5
1 2 3
    0
6 7
```
$\overline{\dfrac{4 - 9}{4 | 11}} = 7$ We are now ready to tackle the general two part congruence of the form:

$$X \equiv A \bmod B \equiv C \bmod P$$

Or in my notation:

$$X = \overline{\dfrac{A | C}{B | P}} \quad \text{Where: } C < P$$
$$P \text{ is Prime, or } B \bmod P$$
$$\text{and } P \text{ are mutually prime.}$$

The smallest positive solution is given by:

$$\left( \overline{\dfrac{C - A \bmod P}{B \bmod P | P}} \right) \times B + A = X$$

Now let's do an example. Suppose we have $$\overline{\dfrac{100{,}000 \ | \ 13}{100{,}033 \ | \ 17}}$$

According to the formula from the previous page.

$$\left(\frac{13-6}{5 \mid 17}\right) 100{,}033 + 100{,}000 = 1{,}600{,}495$$

We are now equipped to handle the multi-part congruence of the form:

$$\frac{A}{B}\left|\frac{C}{P_0}\right|\frac{D}{P_1}\left|\frac{E}{P_2}\right| \ldots \frac{Y}{P_l}\left|\frac{X}{P_k}\right.$$

Where $P_0$ through $P_k$ are prime, or in the following series of ordered pairs, each pair is mutually prime:

$(B \bmod P_0, P_0), (B \times P_0 \bmod P_1, P_1), (B \times P_0 \times P_1 \bmod P_2, P_2) \ldots, (B \times P_0 \times P_1 \times P_2 \times \ldots \times P_{k-1} \bmod P_k, P_k)$.

Let's do a numerical example. Suppose we have:

$$\frac{900}{1013}\left|\frac{3}{17}\right|\frac{8}{11}\left|\frac{2}{7}\right. \quad \text{First we do: } \frac{900}{1013}\left|\frac{3}{17}\right.$$

This equals $\left(\dfrac{3-16}{10 \mid 17}\right) \times 1013 + 900 = 15082$

Then: $\left(\dfrac{8-1}{6 \mid 11}\right) \times 17{,}221 + 15{,}082 = 66{,}745$ Finally: $\left(\dfrac{2-0}{4 \mid 7}\right) \times 189{,}431 + 66{,}745 = 824{,}469$ The reader should now be able to decode prime radix numbers into decimal.

Now we will learn to add, subtract and multiply in prime radix. In general, we just add, subtract or multiply each digit as we ordinarily would and then take the modulus of the result with respect to the appropriate radix. There are two major differences from regular arithmetic. One is that every number involved in the calculation must be expressed in as many or more digits than are required to express the largest number involved in the calculation. The second is that there is no carry.

Let's do some examples. First, an addition problem.

```
  0,1,0,1,1,1, 9,11
+ 0,2,0,4,6,7,13,15
  ─────────────────
  0,3,9,5,7,8,22,26    This is the result of simple addition 0,0,0,5,7,8, 5, 7    Now we have taken the modulus
                       with respect to each successive
                       radix.
```

Now let's do a subtraction and a multiplication in the same format:

```
  1,2,3,5,6,10, 9,13
- 1,1,3,5,7, 2,11,17
  ──────────────────
  0,1,0,0,10,8,15,15

1,1,3,5,7,2,11,17
× 0,1,0,2,1,9,15, 5
  ─────────────────
  0,1,0,3,7,5,12, 9
```

There is an elegant solution to the linear congruence which is easier than the above counting procedure. Let us start by stating the following rule:

$$\frac{A}{B \mid P} = \left[\left(\frac{1}{B \mid P}\right) A\right] \bmod P \cdot B \ \& \ A < P$$

Let's try this with a numerical example:

$$\frac{1}{8 \mid 23} = 3 \quad \frac{17}{8 \mid 23} = 51 \bmod 23 = 5$$

To check $5 \times 8 = 40 \bmod 23 = 17$

Now we are ready to tackle the problem of computing. Since this is a little difficult to learn, we will investigate two examples. First we will give a verbal description of the procedures which are a variant of Euclid's algorithm. Starting with the first two elements of the series, we check to see if the smaller is greater than one half the larger. If it is we replace the smaller term with its complement with respect to the larger. If B is greater than ½P, replace B with P−B. Now find P mod B or P mod (P−B), whichever is indicated. This gives us the third term in our series. Now we must check to see that the third term is not greater than one half the second. If it is we subtract it from the second, and this result becomes our third term. We continue in this procedure until one of our results in either a zero or a one. If it is a zero, B and P are not mutually prime, and the heterodyne chart is ambiguous. If it is a one, we have worked ourselves to the bottom of the chain and are ready to start the return climb, but before we do that, let's do a couple of examples of descending the chain.

```
   1     101    44 × 2 + 13
  57│101   44    13 × 3 +  5
          13     5 × 3 +  2
           5     2 × 2 +  1
           2     2 × 1
           1
```

```
        1
  900,000│999,983    999,983 = 99,983 × 10 + 153
                      99,983 =    153 × 653 + 74
                         153 =     74 ×   2 +  5
                          74 =      5 ×  15 −  1
                           5 =      5 ×   1 +  0
                           1
```

If the reader would note that the last line is always only one, if the chart ends with a one, and the second to the last line always consists of the last number in the series which is greater than one, times one. This is important when we start climbing the chain.

Now to start climbing the chain. All the information we need is in the last two lines of the charts we made earlier.

```
   1
  57│101   2 +
          3 +   2 × 17 + 5 = 39
          3 −   5 ×  3 + 3 = 17
          2     2 ×  3 − 1 =  5
          1
```

And to check: $39 \times 57 = 2223 = 1 \bmod 101$

Here might be a good place to say that this method only works directly if B is greater than ½P. If B is less than ½P, it produces the complement of the number we want with respect to P. Let's climb the chain on our second example together.

$$\frac{1}{900,000 \mid 999,983}$$

```
                    10                  Answer
              653   20285 × 10 + 31 = 202611
              2     31 × 653 + 15    20285
              15 —  15 × 2 + 1 =     31
              1
```

The astute reader will have noticed that this method would be quite applicable to the solution of congruences of fixed radices such as are involved in decoding prime radix numbers. All we have to do is derive the correct series of numbers to go with whatever primes we use as radices and we are in good shape for decoding the associated numbers. That series for the first eleven primes is:

```
2 3 5 7 11 13 17 19 23 29 31
  2 1 4 1  3 15 18 20 12 18
```

These numbers represent $$\frac{1}{B \mid P}$$

for the appropriate congruence.

For example, these are the first few congruences required to decode this number.

1,2,3,4,5,6,7,8,9,10,11

$$\frac{1 \mid 2}{2 \mid 3} \quad \frac{5 \mid 3}{6 \mid 5} \quad \frac{23 \mid 4}{30 \mid 7} \quad \frac{53 \mid 5}{210 \mid 11} \quad \frac{1523 \mid 6}{2310 \mid 13}$$

And the answer is 5,765,999,453

Now we are ready to discuss the general and elegant solution to the linear congruence. Combining the three rules listed below:

$$\frac{A-C}{B \mid P} = \left( \frac{A}{B \mid P} - \frac{C}{B \mid P} + P \right) \mod P$$

$$\frac{A}{B \mid P} = \left[ \left( \frac{1}{B \mid P} \right) A \right] \mod P$$

$$\frac{A \mid C}{B \mid P} = \left( \frac{C - A \mod P}{B \mod P \mid P} \right) B + A$$

We get the formula for solving the linear congruence:

$$\left( \left[ \left( \left[ \left( \frac{1}{B \mid P} \right) C \right] \mod P - \left[ \left( \frac{1}{B \mid P} \right) A \mod P \right] \mod P \right) + P \right] \mod P \right) B + A$$

Now let's do a numerical example:

$$\frac{75 \mid 101}{132 \mid 9973} \quad \frac{1}{132 \mid 9973} = 3551$$

3551 × 101 = 358,651, 358,651 mod 9973 = 9596
3551 × 75 = 266,325, 266,325 mod 9973 = 7027
(9596 − 7027 + 9973) mod 9973 = 2569
2569 × 132 + 75 = 393,183 ≡ 101 mod 9973

$$\frac{75 \mid 101}{132 \mid 9973} = 393,138$$

The above formula can be reduced to the following equivalent relationship:

$$\left[ \left( [(C - A + P) \mod P] \frac{1}{B \mid P} \right) \mod P \right] B + A$$

In most instances, this second form of the formula simplifies the calculations. In certain instances, however, it is preferred to use the first form of the formula. For example, some calculations require that numbers be identified in a heterodyne chart. For that purpose, the first form of the formula should be used.

Present practice in the polynomial format would solve the problem of multiplying a four element number in these terms. A B C, etc., are constant. R is the constant radix.

```
  AR³ +  BR² +  CR + D
  ER³ +  FR² +  GR + H          Operators
 AHR³ + BHR² + CHR + DH
 GBR²   GCR²   GDR
  +      +      +
  —      —      +
  +      +      +
                + (CH + GD) R + DH    Answer
```

To multiply four elements in prime radix, one uses this format.

```
A B C D
E F G H
AE BF CG DH
```

Range, overflow and comparison problems are more difficult to handle in radix than polynomial, and before this invention were probably impossible to handle in a digital system. Discovery and application of heterodyne analysis now make it possible to design a radix-oriented system with throughput many times that of present day polynomial oriented systems.

Figure 1:
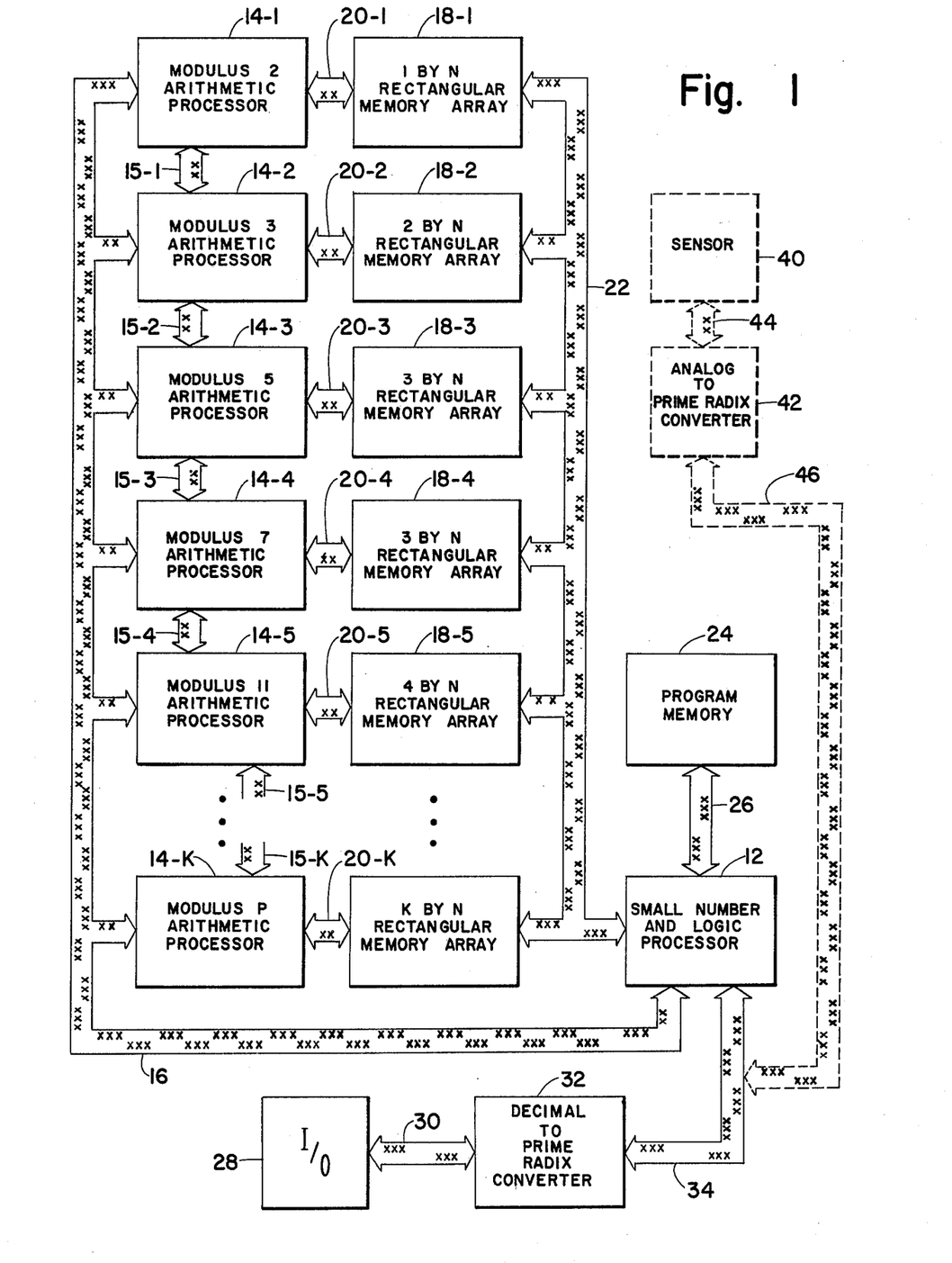
FIG. 1 is a block diagram of a data processing system in accordance with the invention.

With the above principles of the prime or relatively prime radix number system in mind, it is now appropriate to consider the details of a data processing system which operates in prime or relatively prime radix. Turning now to the drawings, more particularly to FIG. 1, an embodiment of a system in accordance with the invention is shown in block diagram form. The system includes a master processor 12 connected to a plurality of parallel processors 14-1 through 14-K by means of cable 16. The master processor 12 may be, for example, an 1802 type 8-bit processor obtainable from RCA Corporation, Princeton, N.J., or an IM 6100 12-bit PDP 8 emulator processor, obtainable from Intersil Corporation, Cupertino, Calif. Cable 16 contains as many lines as there are bits in the organization of the master processor, e.g., 8 or 12. The parallel processors 14-1 through 14-K are modulus 2 through modulus P arithmetic processors, which may be implemented through the use of programmable logic arrays (PLA's), hard wired logic networks, read only memories (ROMS) or a prime radix coded prime radix arithmetic network. If PLA's are employed, commercially available 2371 type 12-bit PLA's, also available from Intersil Corporation, Cupertino, Calif., may be employed.

A set or memory arrays 18-1 through 18-K is connected by means of cables 20-1 through 20K and 22 between each of the parallel processors 14-1 through 14-K and the master processor 12. With this arrangement, data can be transferred between the memory arrays and either the parallel processors 14-1 through 14-K or the master processor 12. The memory arrays 18-1 through 18-K are implemented as random access memories (RAMS), desirable in complimentary metal oxide silicon (CMOS) integrated circuit form. A ROM 24 is connected by cable 26 to the master processor 12. The ROM 24 contains a control program for operation of the processor 12.

In order for data to be entered into the system and output received from the system in a form easily understood by humans, an input/output (I/O) device 28, typically incorporating an alphanumeric keyboard and a printer, is connected by cable 30 to a decimal-prime or relatively prime radix converter 32, which is in turn connected by cable 34 to the master processor 12. Thus, data may be entered through the I/O device 28 in decimal form, converted to prime or relatively prime radix form in decimal-prime or relatively prime radix converter 32, processed by the remainder of the system in prime or relatively prime form, the results supplied back to converter 32, converted back to decimal form, and supplied to the user by I/O device 28. It should, of course, be recognized that the data is in practice manipulated and stored in the system in binary coded prime or relatively prime radix form, since binary numbers are most easily handled with present day data processing circuits.

It is also desirable in certain situations to operate a system in accordance with this invention in various other hybrid number systems, such as binary coded, prime or relatively prime radix coded decimal or prime or relatively prime radix coded decimal. As used herein, the term "prime or relatively prime radix number system" encompasses such hybrid number systems using different prime or relatively prime numbers as radices.

While the converter 32 has been shown as a decimal to prime radix converter, it can be implemented to convert from other number systems, such as octal or hexadecimal to prime or relatively prime radix. In fact, for certain applications such as process control, an alternative approach of direct conversion from an analog sensor 40 connected to converter 42 by bus 44 to convert analog signals to prime or relatively prime radix numbers may be employed. Bus 46 then transmits the data in prime or relatively prime radix form to bus 34 and processor 12. Such data or the results of operations using the data may also be converted to digital form by converter 32 and supplied as an output from I/O device 28. Results of operations may also be converted back to analog form, especially for process control purposes.

Each of the parallel procesors 14-1 through 14-K is connected to its adjacent processors by means of busses 15-1 through 15-K to allow information to be transferred between processors. This allows faster decoding of prime or relatively radix numbers into constant radix numbers.

The system of FIG. 1 can either be operated synchronously from a common clock or asynchronously with a plurality of clocks connected to different elements. Such clocks desirably have frequencies related by small prime numbers. Such asynchronous operation reduces system noise.

In some situations, it is desirable to have the system shown in FIG. 1 communicate rapidly with one or more additional data processing systems which may or may not also operate using a prime or relatively prime radix number system. For most rapid transfer of information to or from such additional data processing system, a bus containing a large number of parallel lines, e.g., up to about 10,000 lines, is advantageous.

A simpler system, in which data in prime or relatively prime radix form is processed serially, rather than in parallel as in the system of FIG. 1, may be also provided. Such a system is shown in block diagram form in FIG. 2. This system has a single, serial prime or relatively prime radix processor 50, which combines the functions of processor 12 and processors 14-1 through 14-K in FIG. 1. The processor 50 is connected by cable 52 to a plurality of memory arrays 18-1 through 18-K, which are of the same type as in FIG. 1. However, since there is only one processor 50, only one cable connection to the memory arrays is required. As in FIG. 1, a ROM 24 containing a control program for operation of the processor 50 is connected to the processor by means of cable 26. Similarly, I/O device 28 is connected by cable 30 to decimal-prime or relatively prime radix converter 32, which is in turn connected to the processor 50 by cable 34. A second ROM 54 loaded with prime or relatively prime numbers is connected to the processor 50 by cable 56, serving as an address and data bus. The ROM 54 is used to provide information for successive scanning of the memory arrays 18-1 through 18-K.

Figure 2:
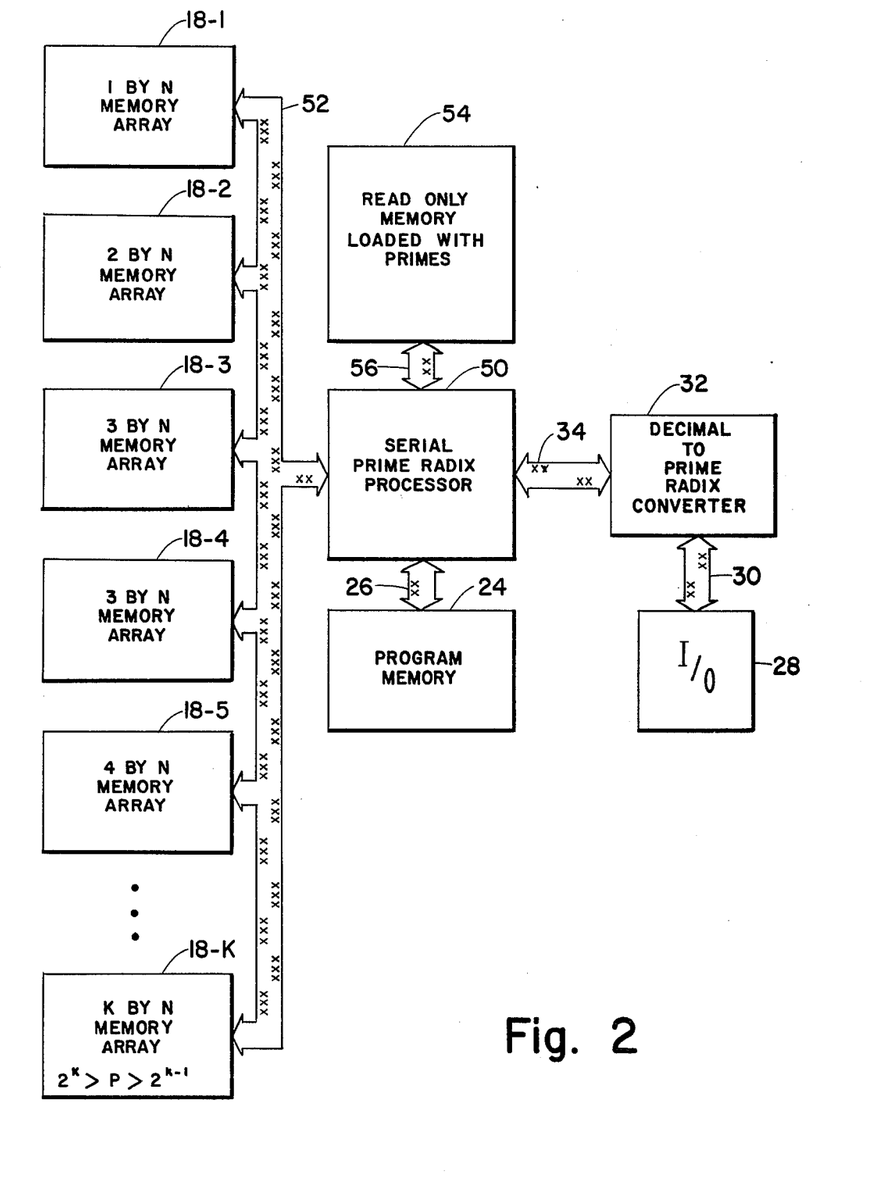
FIG. 2 is a block diagram of another embodiment of a system in accordance with the invention.

In operation, the system of FIG. 2 operates in a similar manner to that of FIG. 1, except that it processes only one prime or relatively prime radix digit at a time, which makes it considerably slower than the parallel machine of FIG. 1, but it is still faster than a comparable binary, constant radix data processing system.

Figure 3:
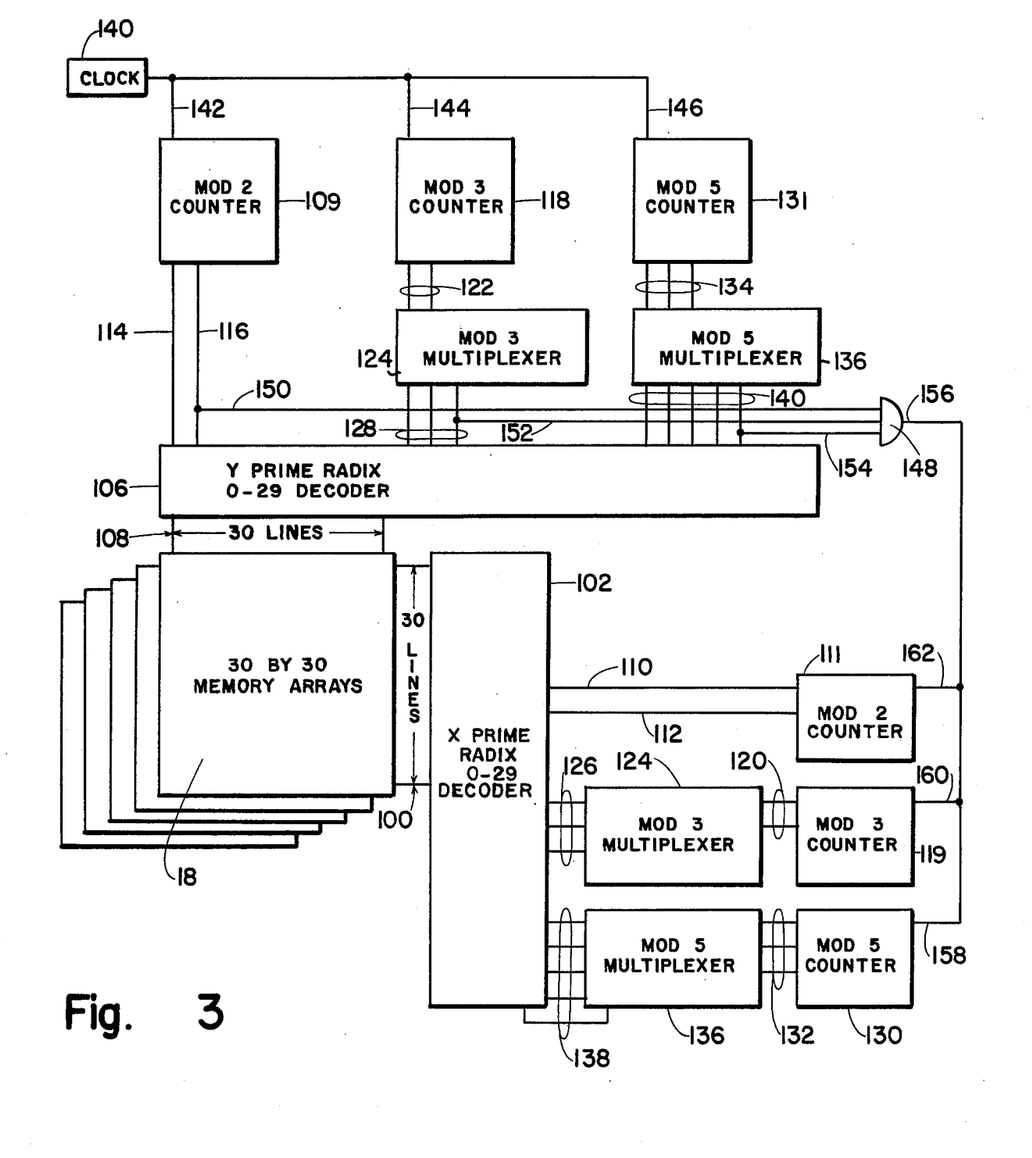
FIG. 3 is a more detailed block diagram of a portion of the system shown in FIGS. 1 and 2, showing connections between the processors and memories of FIGS. 1 and 2.
Figure 4:
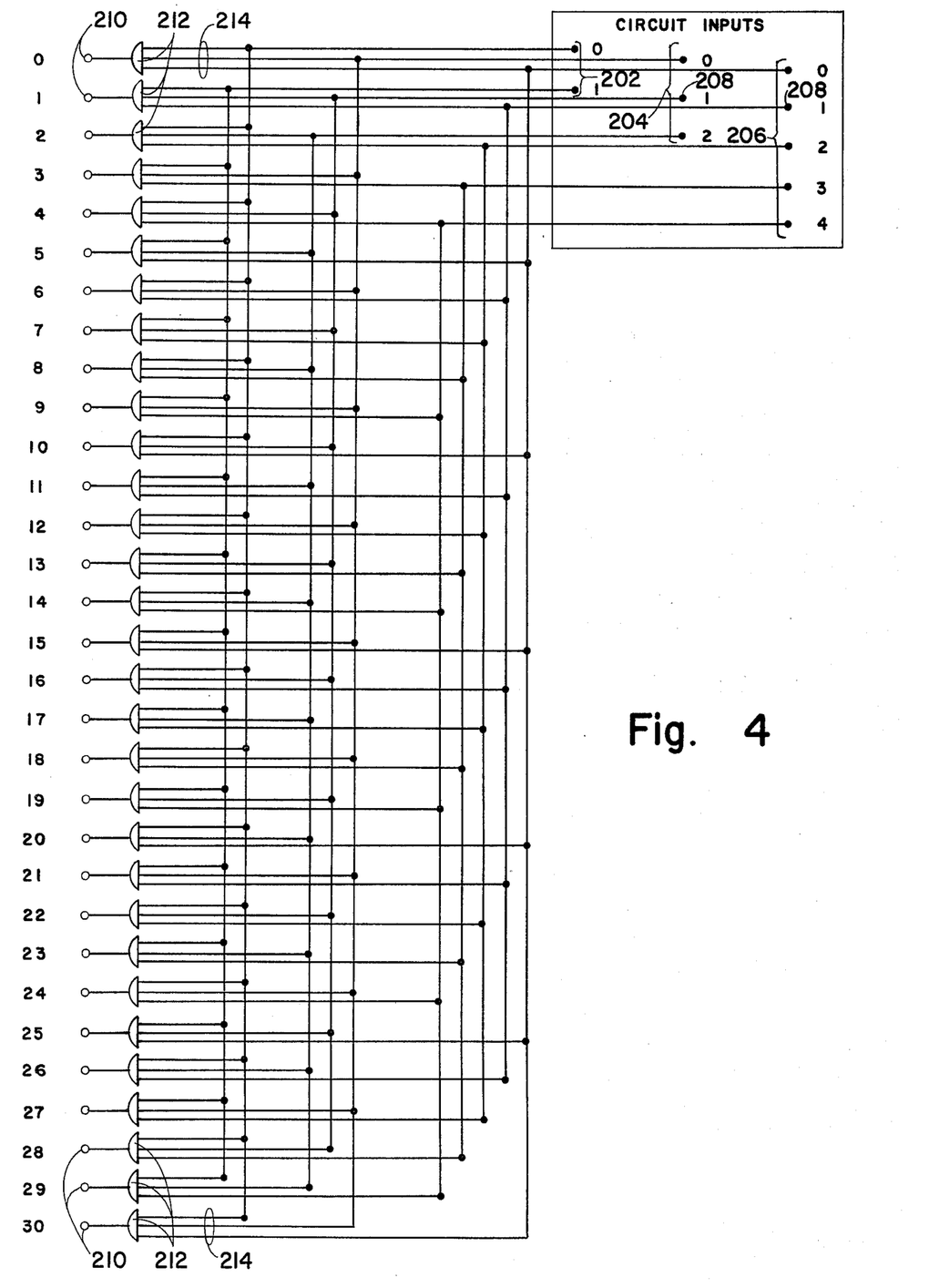
FIG. 4 is a circuit diagram of a portion of the block diagram in FIG. 3, showing the decoders of FIG. 3.

FIG. 3 shows how memory arrays 18 are addressed in prime radix form. The 30×30 random access memory arrays 18 are accessed in the X direction by a total of 30 word lines 100 through a one out of thirty decode circuit 102. Similarly, a total of 30 bit lines 108 are accessed in the Y direction through a one of thirty bit line decode circuit 106. Details of the word line and bit line decode circuits 102 and 106 are shown in FIG. 4 and will be discussed below in connection with that figure. A modulus 2 counter 109 and 111 is connected to each of the decode circuits 102 and 106 by lines 110 and 112 and 114 and 116, respectively. A modulus 3 counter 118 and 119 for each decoder 102 and 106 is connected by lines 122 and 120 respectively, to modulus 3 multiplex circuits 124 for each decoder. The modulus 3 multiplex circuits 124 are in turn connected to their respective decoders 102 and 106 by lines 126 and 128, respectively. Similarly, modulus 5 counters 130 and 131 are connected by lines 132 and 134 to modulus 5 multiplex circuits 136. The modulus 5 multiplexers 136 are connected to their corresponding decode circuits 102 and 106 by lines 138 and 140, respectively. A clock 140 is connected to each of the bit modulus counters 109, 118 and 131 by lines 142, 144 and 146, respectively, in order to synchronize them. In order to run the word modulus counters 11, 119 and 130 from the same clock, line 116 is connected to the gate 148 by line 150, one of lines 128 is connected to the gate 148 by line 152, and one of the lines 140 is connected to the gate 148 by line 154. Output 156 of the gate 148 is connected to the word line modulus counters 111, 119 and 130 by lines 162, 160 and 158, respectively.

In this memory accessing arrangement, the modulus counters act as the program counter. For correct operation, they are triggered on the negative edge of clock pulses generated by clock 140.

FIG. 4 shows details of the word and bit line decode circuits 102 and 106. As shown, the inputs 200 to the decode circuits consist of three groups 202, 204 and 206, each containing a prime number of individual inputs 208, i.e., 2, 3 and 5 inputs 208, respectively. Each of the 30 outputs 210 for the decode circuit has a gate 212. The gate 212 each have three input lines 214, one of which is connected to an input 208 in each of the three groups 202, 204 and 206. The pattern of interconnections between the inputs 208 and the gate 210 is further characterized in that each input 208 in the first group 202 is connected to every other gate 210. The inputs 208 in the second group 204 are each connected to every third gate 210 and the inputs 208 in the third group 206 are each connected to every fifth gate. With this pattern of interconnections, it is possible to identify uniquely any one of the 30 outputs 210 from the decoder by providing a signal on one input 208 in each of the three groups 202, 204 and 206. This decoder provides a regular array of gates connected in a simple pattern that is easy to understand and trouble shoot at the technician level. It further makes efficient use of semiconductors.

It is, of course, possible to extend this concept to a decoder including a large number of groups of inputs, with a different prime or relatively prime number of inputs in each group. For example, with a fourth group containing seven inputs in addition to the three groups shown, it is possible to identify uniquely any one of 210 outputs. With a fifth group containing 11 inputs, the number of outputs that can be uniquely identified increases to 2,310. In contrast, increasing the number of inputs in a binary decoder by one only doubles the number of outputs that can be uniquely identified. For example, with four inputs, 16 outputs can be uniquely identified, and with five inputs, 32 outputs can be uniquely identified. This difference is indicative of the power of the prime or relatively prime radix concept.

Figure 5:
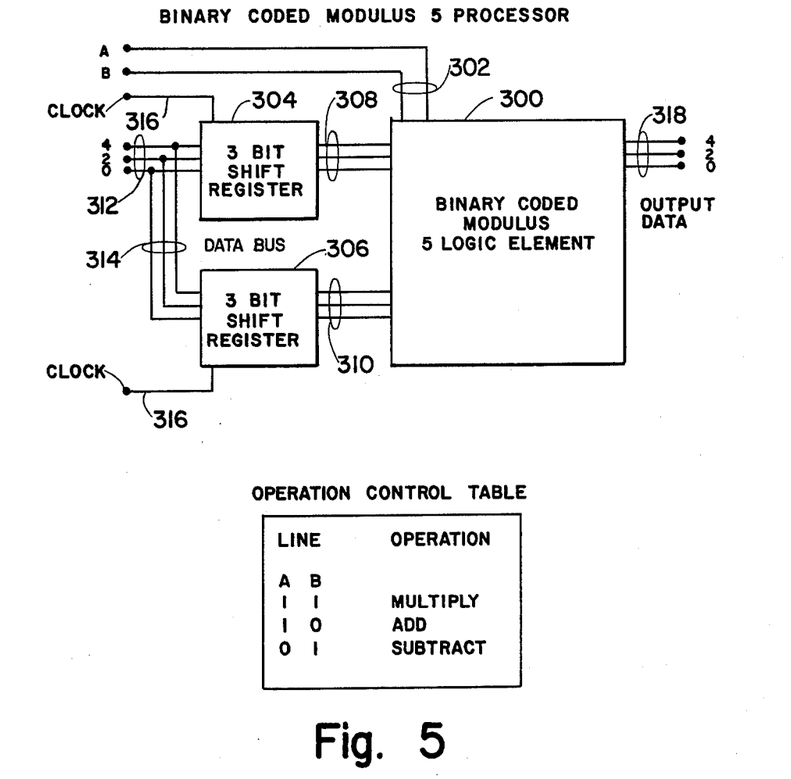
FIG. 5 is another more detailed block diagram of one arithmetic processor of the system shown in FIG. 1.
Figure 6:
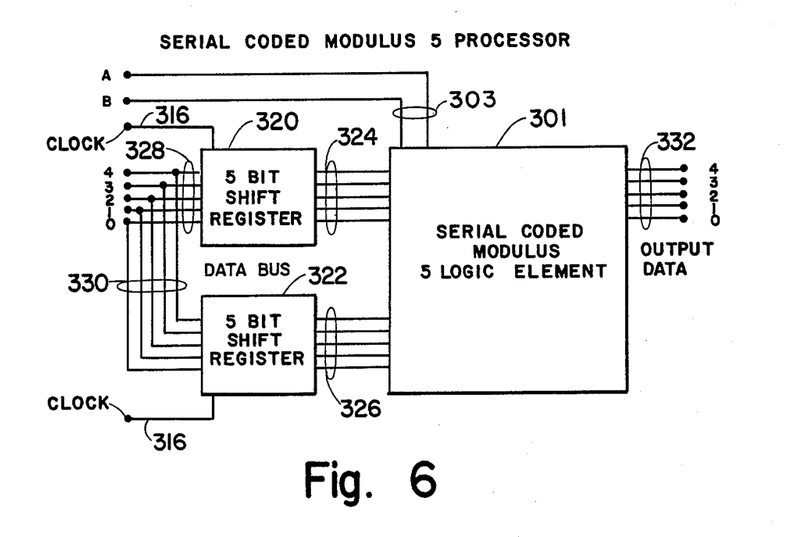
FIG. 6 is a similar more detailed block diagram of a portion of the processor in the system shown in FIG. 2.

FIGS. 5 and 6 show two forms of a modulus 5 processor which can be employed in either system shown in FIGS. 1 and 2. Each processor has a coded modulus 5 logic element 300 and 301, respectively, desirably implemented as a PLA. The difference in the logic elements resides in their programming as binary coded or serial coded, respectively. Both of the logic elements 300 and 301 have a pair of operation control lines 302 and 303, respectively, connected to them for determining which processing operation is to be carried out. The truth table in FIG. 5 shows the respective signals for multiplication, addition, and subtraction. The binary coded modulus 5 processor has two three-bit shift registers 304 and 306, each connected by three input lines 308, 310, respectively to the logic element 300. A data bus 312 is connected to the shift register 304, and by lines 314, to shift register 306. Each of the shift registers has a clock input 316 for synchronization purposes. Results of operations carried out by the logic element 300 are supplied on three output lines 318.

Similarly, the serial coded modulus 5 processor 301 in FIG. 6 has two 5-bit shift registers 320 and 322, each connected to the logic element 300 by five lines 324 and 326, respectively. Data bus 328 is connected to the shift register 320, and by lines 330, to shift register 320 and 322. Results of operations carried out by the logic element 301 are furnished on five output data lines 332.

The division process is interactive. The basic difficulty is that there is no simple way to tell the magnitude of a prime or relatively prime radix number. The presently favored approach is to decode the numbers into a floating-point, constant radix system and perform the division in that system to form a first estimate. The indicated multiplication and subtraction is then performed in prime or relatively prime radix and the remainder is translated out. Two or three such steps should suffice for almost any divisor and dividend. The difficult case is when the divisor is small and the dividend large. This may take at least 1500 machine cycles, but is still less complicated than a full divide at these levels of magnitude.

The best mode for a system in accordance with this invention in most situations is a system in the true prime radix number system form. This form of the invention is preferred because it makes more efficient information processing use of a given quantity of hardware provided. Certain number theory concepts can be implemented on the invention in this form that cannot be implemented in the invention embodied in a relatively prime radix number system form. For example, an algorithm that can tell how many factors a large number could have is much more easily implemented in a true prime radix number system configuration than in a relatively prime radix number system configuration.

Certain considerations are important where a system configured in accordance with this invention will interface with a conventional polynomially configured system. For such systems, a list of mutually prime numbers constituting the first such numbers which are less than the square root of the range of the system you are operating in is required.

The appendices to this application are certain programs useful for a further understanding of the invention. Appendix I attached to and forming a part of this specification solves a two-section linear congruence given two divisors and two remainders less than $2^{16}$. This is the range of double precision operation on the Z80 microprocessor. Appendix II is a cross-reference listing of variables used with Appendix I.

It should be apparent to those skilled in the art that an improved data processing system capable of achieving the stated objects of the invention has been provided. The system is configured to take advantage of simplified nature of arithmetic operations in prime or relatively prime radix form, compared with constant radix arithmetic operations. As a result, multiplication, addition and subtraction of very large numbers can be accomplished in this system in only one or two machine cycles where thousands of machine cycles are typically required for similar operations with constant radix numbers. Because data input and output is in conventional decimal numbers, the prime or relatively prime radix operation of the system is transparent to the user except for the rapidity of the operation, and the user need have no understanding of prime or relatively prime radix arithmetic.

It should be further apparent to those skilled in the art that various changes in form and details of the invention as described above may be made. It is intended that such changes be included within the spirit and scope of the claims appended hereto.

APPENDIX I

```
REM CONGRUENCE SOLUTION ALGORYTHM

PRINT "CONGRUENCE SOLUTION TO 65535."

30      PRINT " "
        INPUT "ONECONIN" , ONECONIN
        INPUT "ONECONMOD" , ONECONMOD
        IF ONECONMOD = 0 THEN GOTO 35
        PRINT " "
        INPUT "TWOCONIN" , TWOCONIN
        INPUT "TWOCONMOD" , TWOCONMOD

IF ONECONMOD > TWOCONMOD THEN \
        TEMP = ONECONMOD : ONECONMOD = TWOCONMOD : TWOCONMOD = TEMP : \
        TEMP = ONECONIN : ONECONIN = TWOCONIN : TWOCONIN = TEMP

NUMBER = ONECONIN
        LINES = ONECONMOD
        ELEMENTS = TWOCONMOD

GOSUB 10

PRINT "ONEPOSITION = " , ONEPOSITION
        MODIN = TWOCONIN * POSITION
        MODUL = ELEMENTS
        GOSUB 1.01
        TWOPOSITION = MODOUT
        PRINT "TWOPOSITION = " , TWOPOSITION
        MODIN = TWOPOSITION - ONEPOSITION + ELEMENTS
        GOSUB 1.01
        POSDIFF = MODOUT
        PRINT " POSDIFF = " , POSDIFF
        SOLUTION = MODOUT * ONECONMOD + ONECONIN
        PRINT "SOLUTION = " , SOLUTION
        GOTO 30

10      GOSUB 1
        PRINT "  POSITION = " , POSITION

MODIN = NUMBER * POSITION
        MODUL = ELEMENTS
        GOSUB 1.01
        ONEPOSITION = MODOUT
        MODIN = ONEPOSITION * LINES 1.02    RETURN

REM EUCLID'S ALGORYTHM WITH SYSTEMATIC SIGN CHANGES.

1       INDEX = 1
        DIM A(15)
```

```
       PRINT " "
       PRINT "LINES = " , LINES , " , " , "ELEMENTS = " , ELEMENTS

IF ELEMENTS > 65535 THEN \
       PRINT "SORRY, THIS ROUTINE CAN NOT ACCEPT NUMBERS > 65535." \
       : GOTO 30

1.1    A = ELEMENTS . P = LINES

2      Q = INT (A/P) . R = A - Q*P
       IF R > P/2 THEN R = P - R . Q = -Q -1 : GOTO 2.1

2.1    A(INDEX) = Q : INDEX = INDEX + 1
       IF R = 0 THEN 4.5
       A = P . P = R
       GOTO 2

4.5    IF P > 1 THEN PRINT " FACTOR " ; P . GOTO 30

CONSTANT = 1 : PRECONSTANT = 0
       FOR TWODEX= 3 TO INDEX
       DOWNDEX = INDEX - TWODEX + 1
       TEMP = CONSTANT

IF A(DOWNDEX) > 0 THEN \
       A(DOWNDEX) = ABS (A(DOWNDEX)) : \
       CONSTANT = (CONSTANT * A(DOWNDEX) + PRECONSTANT) . \
       GOTO 4.6 . \
       ELSE \
       A(DOWNDEX) = ABS (A(DOWNDEX)) . \
       CONSTANT = (CONSTANT * A(DOWNDEX) - PRECONSTANT)

4.6    PRECONSTANT = TEMP
       NEXT TWODEX

MODIN = CONSTANT * LINES
       MODUL = ELEMENTS
       GOSUB 1.01

POSITION = CONSTANT
       IF MODOUT = 1 THEN GOTO 4.7

POSITION = ELEMENTS - POSITION
       MODIN = POSITION * LINES
       GOSUB 1.01
       IF MODOUT = 1 THEN GOTO 4.7

PRINT "CONSTANT ERROR"
       GOTO 30

4.7    RETURN 1.01       MODQ = INT (MODIN/MODUL)
           MODOUT = MODIN - MODQ * MODUL
           RETURN
```

APPENDIX II

THIS LIST OF VARIABLES FOR THE TWOCON PROGRAM SHOULD COVER MOST OF THE VARIABLES USED IN UCPRNT, EUCPRNT, AND POSPRNT ALSO.

A(15) IS A DIMENSIONED VARIABLE USED TO STORE THE Q'S FROM SUBROUTINE 1.

CBASIC XREF LISTING OF B:TWOCON.BAS                    PAGE NO 1

```
     NAME                TYPE

A                        GLOBAL    55,  63,  65,  68,  70,  80,
                                   81,  82,  85,  86
THE INPUT TO THE MODULUS ROUTINE WHICH IS A PART OF SUBROUTINE 1, THE
EUCLID'S ALGORYTHM SUBROUTINE.

CONSTANT                 GLOBAL    75,  78,  82,  86,  91,  95
THIS VARIABLE IS INCREMENTED ON EACH LOOP OF THE SECOND PART OF SUBROUTINE
1. ON THE FINAL LOOP IT WILL EITHER = POSITION OR THE COMPLEMENT OF
POSITION WITH RESPECT TO ELEMENTS.

DOWNDEX                  GLOBAL    77,  80,  81,  82,  85,  86
AN INDEX VARIABLE USED IN THE SECOND LOOP OF SUBROUTINE ONE.

ELEMENTS                 GLOBAL    20,  26,  30,  43,  57,  59,
                                   63,  92,  98
USED IN SUBROUTINE 1. DEFINES THE NUMBER OF ELEMENTS IN THE HETERODYNE
CHART BEING ANALYZED.

INDEX                    GLOBAL    54,  68,  76,  77
POINTS AT THE LIST OF MODQ'S COMPUTED BY SUBROUTINE 1.

LINES                    GLOBAL    19,  46,  57,  63,  91,  99
USED BY SUBROUTINE ONE TO DEFINE THE NUMBER OF LINES IN THE HETERODYNE
CHART BEING ANALYZED.

MODIN                    GLOBAL    25,  30,  42,  46,  91,  99,
                                   108, 109
INPUT TO THE MODULUS SUBROUTINE (1.01).

MODOUT                   GLOBAL    28,  32,  34,  45,  96,  101,
                                   109
OUTPUT FROM SUBROUTINE 1.01.

MODQ                     GLOBAL    108, 109
QUOTIENT FROM SUBROUTINE 1.01

MODUL                    GLOBAL    26,  43,  92,  108, 109
DIVISOR FROM SUBROUTINE 1.01

NUMBER                   GLOBAL    18,  42
THIS IS AN INPUT TO SUBROUTINE 10 WHICH FINDS ANY NUMBER IN A HETERODYNE
CHART.

ONECONIN                 GLOBAL    6,   15,  18,  34
THE FIRST INPUT TO THE CONGRUENCE SOLUTION ALGORYTHM.
```

ONECONMOD            GLOBAL    7, 8, 13, 14, 19, 34
THE FIRST MODUL INPUT TO THE CONGRUENCE SOLUTION ALGORYTHM.

ONEPOSITION          GLOBAL    24, 30, 45, 46
THE POSITION OF ONECONIN IN THE HETERODYNE CHART DEFINED BY ONECONMOD AND TWOCONMOD.

P                    GLOBAL    63, 65, 66, 70, 73
THE MODUL OF THE MODULUS TAKING ROUTINE USED BY THE EUCLID'S ALGORYTHM SUBROUTINE (1).

POSDIFF              GLOBAL    32, 33
THE RESULT OF THE MODULAR SUBTRACTION:
    POSDIFF = (TWOPOSITION - ONEPOSITION) MOD ELEMENTS.

POSITION             GLOBAL    25, 40, 42, 95, 98, 99
THE POSITION OF THE ONE IN THE HETERODYNE CHART DEFINED BY LINES AND ELEMENTS. (SUBROUTINE 1)

PRECONSTANT          GLOBAL    75, 82, 86, 88
THIS VARIABLE IS USED BY THE SECOND HALF OF SUBROUTINE 1 TO SAVE THE RESULTS OF THE PREVIOUS LOOP TO BE USED IN CALCULATING THE VALUE OF CONSTANT.

Q                    GLOBAL    65, 66, 68
THE QUOTIENT OF THE MODULUS ROUTINE USED BY SUBROUTINE 1.

R                    GLOBAL    65, 66, 69, 70
THE OUTPUT OF THE MODULUS ROUTINE USED BY SUBROUTINE ONE.

SOLUTION             GLOBAL    34, 35
THE SOLUTION TO THE CONGRUENCE:
    SOLUTION = ONECONIN MOD ONECONMOD = TWOCONIN MOD TWOCONMOD

TEMP                 GLOBAL    14, 15, 78, 88
USED FOR TEMPORARY STORAGE OF OTHER VALUES AT VARIOUS PLACES IN THE PROGRAM.

TWOCONIN             GLOBAL    10, 15, 25
THE THIRD INPUT TO THE CONGRUENCE SOLUTION ALGORYTHM.

TWOCONMOD            GLOBAL    11, 13, 14, 26
THE LAST INPUT TO THE CONGRUENCE SOLUTION ALGORYTHM.

TWODEX               GLOBAL    76, 77, 89
USED TO COUNT THE NECESSARY NUMBER OF LOOPS IN THE SECOND PART OF SUBROUTINE 1.

TWOPOSITION          GLOBAL    28, 29, 30
THE POSITION OF TWOCONIN IN THE HETERODYNE CHART DEFINED BY ONECONMOD AND TWOCONMOD.

What is claimed is:
1. A data processing system, which comprises:
(a) an input/output device for inputting data in a constant radix number system and for outputting results of operations carried out in said data processing system in a constant radix number system,

(b) means connected to said input/output device for converting the input data from a constant radix number system to a number system in which the radices of all digits in a number are at least relatively prime, and for converting the results of the operations from the at least relatively prime radix form to the constant radix number system by solving a linear congruence of the at least relatively prime radices through use of a relationship equivalent to:

$$\left(\left[\left(\left[\left(\frac{1}{B|P}\right)c\right]\mod P - B + A,\right.\right.\right.$$

$$\left.\left.\left.\left[\left(\frac{1}{B|P}\right)A\mod P\right]\mod P\right)+P\right]\mod P\right)$$

wherein A is the converted value of preceeding at least relatively prime radix digits to the digit being converted; B is the product of all radices of at least relatively prime radix digits preceeding the digit being converted, C is the value of the at least relatively prime radix digit being converted, and P is the radix of the digit being converted, (c) processing means connected to said converting means for carrying out operations on the input data in at least relatively prime radix form, and (d) memory means connected to said processing means for storing the input data and results of operations thereon in at least relatively prime radix form.

2. The system of claim 1 in which the equivalent relationship is:

$$\left[\left([(C - A + P)\mod P]\frac{1}{B|P}\right)\mod P\right]B + A.$$

3. The data processing system of claim 1 including a master processor and said processing means includes a plurality of processors each capable of executing operations in prime radix form in parallel under control of said master processor.

4. The data processing system of claim 1 in which said converting means converts the input data to a number system in which radices of the digits are relatively prime.

5. The data processing system of claim 1 in which said converting means converts the input data to a number system in which the radices of all the digits are each a different prime number.

6. A data processing system, which comprises:
(a) an input/output device for inputting data in a first given form and for outputting results of operations carried out in said system in a second given form,
(b) means connected to said input/output device for converting the input data from the first given form to a number system in which the radices of all digits in a number are at least relatively prime, and for converting the results of the operations from the at least relatively prime radix form to the second given form,
(c) processing means connected to said converting means for carrying out operations on the input data in at least relatively prime radix form, and
(d) memory means connected to said processing means for storing the input data and results of operations thereon in at least relatively prime radix form, said memory means and said processing means being connected by means of decode circuits including a plurality of gates each having an output lead and a plurality of input terminals connected to said gates, said plurality of terminals being arranged in groups each containing a successively larger at least relatively prime number of the terminals, each gate having a number of connections to said plurality of input terminals, each terminal of each group being connected to one out of a number of gates corresponding to the number of terminals in the group.

7. The data processing system of claim 6 in which said converting means converts the input data from the first given form to a number system in which radices of the digits are relatively prime.

8. The data processing system of claim 6 in which said converting means converts the input data from the first given form to a number system in which the radices of all the digits are each a different prime number.

9. The data processing system of claim 6 in which the first and second given forms are the same given form.

10. The data processing system of claim 9 in which the given form is a constant radix number system.

11. A data processing system, which comprises:
(a) an input/output device for inputting data in a first given form and for outputting results of operations carried out in said system in a second given form,
(b) means connected to said input/output device for converting the input data from the first given form to a number system in which the radices of all digits in a number are at least relatively prime and for converting the results of the operations from the at least relatively prime radix form to the second given form,
(c) processing means connected to said converting means for carrying out operations on the input data in at least relatively prime radix form, and
(d) memory means connected to said processing means for storing the input data and results of operations thereon in at least relatively prime radix form, said memory means is being arranged in arrays of unequal size, with smaller memory arrays for the first significant digits of at least relatively prime radix numbers, and the arrays increasing in size for further significant digits of at least relatively prime radix numbers in relation to the relative value of successive at least relatively prime radices.

12. The data processing system of claim 11 in which said converting means converts the input data from the first given form to a number system in which radices of the digits are relatively prime.

13. The data processing system of claim 11 in which said converting means converts the input data from the first given form to a number system in which the radices of all the digits are each a different prime number.

14. The data processing system of claim 11 in which the first and second given forms are the same given form.

15. The data processing system of claim 14, in which the given form is a constant radix number system.

16. The system of claim 11 including a master processor and said processing means includes a plurality of processors each capable of executing operations in prime radix form in parallel under control of a master processor, and the memory arrays are each connected between one of said parallel processors and said master processor.

17. A data processing system, which comprises:
(a) an input/output device for inputting and outputting data in, respectively, a first and second given form,
(b) means connected to said input/output device for converting the input data to a number system in which the radices of all digits in a number are at least relatively prime,
(c) processing means connected to said converting means for carrying out operations in at least relatively prime radix form, and
(d) memory means connected to said processing means for storing the input data and results of operations thereon in at least relatively prime radix form, and
(e) means connected between said processing means and said input/output device for converting the results of operations on the input data from at least relatively prime radix form to the second given form, using a relationship equivalent to:

$$\left(\left[\left(\left[\left(\frac{1}{B|P}\right)C\right]\mod P - \left[\left(\frac{1}{B|P}\right)A\mod P\right]\mod P\right)+P\right]\mod P\right)B+A$$

wherein A is the converted value of preceeding at least relatively prime radix digits preceeding the digit being converted, C is the value of the at least relatively prime radix digit being converted and P is the radix of the digit being converted.

18. The data processing system of claim 17 in which said input/output device provides the data in constant radix form.

19. The data processing system of claim 17 in which said input/output device provides the data in analog form.

20. The data processing system of claim 17 in which the at least relatively prime radix number system is binary coded at least relatively prime radix form.

21. The data processing system of claim 20 in which the at least relatively prime radix number system is binary coded, prime radix coded decimal.

22. The data processing system of claim 17 including a master processor and said processing means includes a plurality of processors each capable of executing operations in prime radix form in parallel under control of a master processor.

23. The data processing system of claim 22 in which adjacent ones of said parallel processors are connected together.

24. The data processing system of claim 17 in which said converting means converts the input data from the first given form to a number system in which the radices of the digits are relatively prime.

25. The data processing system of claim 17 in which said converting means converts the input data from the first given form to a number system in which the radices of all the digits are each a different prime number.

26. The data processing system of claim 17 in which the first and second given forms are the same given form.

27. The data processing system of claim 17 in which the equivalent relationship is:

$$\left[\left(\left[(C-A+P)\mod P\right]\frac{1}{B|P}\right)\mod P\right]B+A.$$

28. A data processing method, which comprises:
(a) providing input data in a first given form to an input device of a data processing system;
(b) converting the input data to an at least relatively prime radix number system form;
(c) storing and retrieving the input data in and from a memory of the data processing system in the at least relatively prime radix form;
(d) carrying out operations in a processor of the data processing system on said input data in the at least relatively prime radix form;
(e) storing and retrieving the results of the operations in and from a memory of the data processing system in the at least relatively prime radix form; and
(f) converting results of the operations in the data processing system from the at least prime radix form to a second given form through use of a relationship equivalent to:

$$\left(\left[\left(\left[\left(\frac{1}{B|P}\right)C\right]\mod P - \left[\left(\frac{1}{B|P}\right)A\mod P\right]\mod P\right)+P\right]\mod P\right),B+A$$

wherein A is the converted value of preceeding at least relatively prime radix digits to the digit being converted, B is the product of all radices of at least relatively prime radix digits preceeding the digit being converted, C is the value of the at least relatively prime radix digit being converted and P is the radix of the digit being converted.

29. The data processing method of claim 28 in which the equivalent relationship is:

$$\left[\left(\left[(C-A+P)\mod P\right]\frac{1}{B|P}\right)\mod P\right]B+A.$$

30. The data processing method of claim 28 in which the input data is converted from the first given form to a number system in which the radices of the digits are relatively prime.

31. The data processing method of claim 28 in which the input data is converted from the first given form to a number system in which the radices of all the digits are each a different prime number.

32. The data processing method of claim 28 in which the first and second given forms are the same form.

33. The data processing method of claim 32 in which the first and second given forms are a constant radix form.

34. The data processing method of claim 32 in which the first and second given forms are an analog form.

* * * * *